United States Patent
Furze et al.

(10) Patent No.: US 12,382,156 B2
(45) Date of Patent: Aug. 5, 2025

(54) LAUNCH MONITOR HAVING A LED STROBE

(71) Applicant: ACUSHNET COMPANY, Fairhaven, MA (US)

(72) Inventors: Paul A. Furze, Tiverton, RI (US); Jeremy Zorrilla De Los Santos, Whitinsville, MA (US)

(73) Assignee: ACUSHNET COMPANY, Fairhaven, MA (US)

( * ) Notice: Subject to any disclaimer, the term of this patent is extended or adjusted under 35 U.S.C. 154(b) by 109 days.

(21) Appl. No.: 18/147,881

(22) Filed: Dec. 29, 2022

(65) Prior Publication Data

US 2024/0223877 A1     Jul. 4, 2024

(51) Int. Cl.
*H04N 23/56* (2023.01)
*A63B 69/36* (2006.01)
(Continued)

(52) U.S. Cl.
CPC ......... *H04N 23/56* (2023.01); *A63B 69/3623* (2013.01); *F21V 19/001* (2013.01);
(Continued)

(58) Field of Classification Search
CPC .................. H04N 23/56; G06T 7/292; G06T 2207/30224; G06T 2207/30241;
(Continued)

(56) References Cited

U.S. PATENT DOCUMENTS

| | | | |
|---|---|---|---|
| 5,471,383 A | 11/1995 | Gobush et al. | |
| 6,430,371 B1 * | 8/2002 | Cho | G03B 15/03 396/176 |

(Continued)

FOREIGN PATENT DOCUMENTS

| | | | | |
|---|---|---|---|---|
| CA | 2636820 A1 * | 7/2007 | ......... | A63B 24/0003 |
| CA | 3103134 A1 * | 12/2019 | ......... | A61B 1/00194 |

(Continued)

OTHER PUBLICATIONS

Nakauti translation o RU 2662552 C2 Oct. 31, 2013 (Year: 2013).*
(Continued)

*Primary Examiner* — Zaihan Jiang
(74) *Attorney, Agent, or Firm* — Finnegan, Henderson, Farabow, Garrett & Dunner, LLP

(57) ABSTRACT

A launch monitor is disclosed. The launch monitor may have a base, and an imaging device supported on the base. The imaging device may capture images of the object traversing the field of view. The launch monitor may have a lighting unit that emits one or more flashes of light to illuminate the object in the field of view. A duration of each flash or a time period between flashes may be adjustable. The launch monitor may have a controller that generates trigger signals to cause the lighting unit to emit flashes of light. The trigger signals may control the duration of each flash or the time period between flashes. The controller may also cause the imaging device to capture images of the object when illuminated by the flashes of light. Further, the controller may analyze the captured images to determine a parameter associated with the flight of the object.

19 Claims, 7 Drawing Sheets

(51) Int. Cl.
  *F21V 19/00* (2006.01)
  *F21V 19/04* (2006.01)
  *G06T 7/292* (2017.01)
  *F21Y 115/10* (2016.01)
(52) U.S. Cl.
  CPC .............. *F21V 19/04* (2013.01); *G06T 7/292* (2017.01); *A63B 2220/05* (2013.01); *A63B 2220/35* (2013.01); *A63B 2220/807* (2013.01); *A63B 2225/74* (2020.08); *F21Y 2115/10* (2016.08); *G06T 2207/30224* (2013.01); *G06T 2207/30241* (2013.01)
(58) Field of Classification Search
  CPC ............ A63B 69/3623; A63B 2225/74; A63B 2220/05; A63B 2220/35; A63B 2220/807; F21V 19/001; F21V 19/04; F21Y 2115/10
  See application file for complete search history.

(56) References Cited

U.S. PATENT DOCUMENTS

| | | | |
|---|---|---|---|
| 7,086,955 B2 | 8/2006 | Gobush et al. | |
| 8,500,568 B2 | 8/2013 | Bissonnette et al. | |
| 2005/0026710 A1* | 2/2005 | Pao | A63B 71/06 473/141 |
| 2005/0268704 A1* | 12/2005 | Bissonnette | A63B 24/0003 73/65.03 |
| 2005/0268705 A1* | 12/2005 | Gobush | A63B 69/3658 73/65.03 |
| 2005/0272512 A1* | 12/2005 | Bissonnette | A63B 71/06 473/151 |
| 2005/0272513 A1* | 12/2005 | Bissonnette | A63B 69/3623 473/151 |
| 2005/0272514 A1* | 12/2005 | Bissonnette | A63B 69/3658 473/151 |
| 2005/0272516 A1* | 12/2005 | Gobush | A63B 71/06 473/200 |
| 2005/0282645 A1* | 12/2005 | Bissonnette | A63B 24/0021 473/131 |
| 2007/0201847 A1* | 8/2007 | Lei | G03B 13/10 396/51 |

FOREIGN PATENT DOCUMENTS

| | | | | |
|---|---|---|---|---|
| CN | 114589110 A | * | 6/2022 | |
| CN | 115789535 A | * | 3/2023 | |
| EP | 3876143 A1 | * | 9/2021 | ........... B60Q 1/0023 |
| RU | 2662552 C2 | * | 7/2018 | ........... A61K 8/0204 |
| SE | 1650525 A1 | * | 4/2016 | |

OTHER PUBLICATIONS

Bierwipfl translation o EP 3876143 A1 Mar. 2, 2020 (Year: 202).*
Chen translation of CN 114589110 A Mar. 2, 2022 (Year: 2022).*
Nakauti translation of RU 2662552 C2 Oct. 31, 2013 (Year: 2013).*
Bierwipfl translation of EP 3876143 A1 Mar. 2, 2020 (Year: 202) (Year: 2020).*
Bai, Jun-chun translation of CN 115789535 A Nov. 14, 2022 (Year: 2022).*

* cited by examiner

LAUNCH MONITOR HAVING A LED STROBE

TECHNICAL FIELD

The present disclosure relates generally to a launch monitor, and more particularly, to a launch monitor having a Light Emitting Diode (LED) strobe.

BACKGROUND

Golf players typically use golf ball launch monitors to assess the quality of their golf swings by determining various parameters associated with a flight of a golf ball when it is hit by a golf club. Such flight parameters may include speed of the golf ball, trajectory of the golf ball, spin of the golf ball, an angle at which the golf club hits the golf ball, and/or other flight parameters that may determine how far or how fast the golf ball will travel. Launch monitors may include one or more cameras and one or more strobe lights to illuminate and freeze the motion of a rapidly moving object (e.g., golf ball or head of a golf club) at a precise time. The strobe lights emit flashes of light at predetermined time intervals, and the cameras capture images of the golf ball and/or the golf club each time the golf ball or golf club is illuminated by a flash of light. The images are analyzed to determine changes in position of the golf ball or golf club in the time elapsed between successive flashes of light. This data is then used to determine one or more of the parameters described above.

To freeze the motion of an object, the duration of the flash of light emitted by the strobe lights must be short. Otherwise, the image of the object captured by the camera will blur on the leading and trailing edges by an amount equal to the distance that the object moves while the strobe light is on (i.e., during the time the strobe light illuminates the object). A shorter flash produces less blur. However, reducing the duration of the flash results in less light being available for illuminating the object, which in turn may lead to darker images, making it difficult to accurately determine the position of the object from the images.

A speed of the object is determined from the captured images by determining the change in position of the object divided by the time over which such change occurs. The time period for the change in position is determined based on the times at which the images are captured by the cameras. Thus, any error in determining the time period between successive flashes of light (which corresponds to the times when the cameras capture images of the object) produces a corresponding error in the measurement of speed.

Strobe lights in conventional launch monitors employ one or more flashtubes as the lighting element. Although a flashtube can produce a great deal of light, it requires at least a few milliseconds to recharge. Because the field of view of the launch monitor cameras is not very wide, however, the duration between flashes must be relatively short (of the order of microseconds instead of milliseconds) to be able to capture more than one image of the object as it traverses the field of view. Some solutions to the problem of the relatively large recharge time of a flashtube include using multiple flashtubes or using a single flashtube with multiple power supplies and controllers. However, use of multiple flashtubes and/or power supplies is likely to produce variation in the brightness of the light emitted in successive flashes and/or variation in the duration between flashes. Such variations introduce error in the determination of the one or more flight parameters associated with the object. Furthermore, adding components such as flashtubes, power supplies, and/or controllers undesirably increases the cost, size, and weight of the launch monitor.

The launch monitor of the present disclosure solves one or more of the problems set forth above and/or other problems of the prior art.

SUMMARY

In some embodiments, the present disclosure is directed to a launch monitor configured to monitor a flight of an object traversing a field of view. The launch monitor may include a base, and an imaging device supported on the base. The imaging device may be configured to capture one or more images of the object traversing the field of view. The launch monitor may also include a lighting unit configured to emit one or more flashes of light to illuminate the object in the field of view. A duration of the one or more flashes or a predetermined time period between the one or more flashes may be adjustable. The launch monitor may include a controller. The controller may be configured to generate one or more trigger signals to cause the lighting unit to emit the one or more flashes of light. The one or more trigger signals may be configured to control at least one of the duration of each of the one or more flashes or the predetermined time period between the one or more flashes. The controller may also be configured to cause the imaging device to capture the one or more images of the object when the object is illuminated by the one or more flashes of light. Further, the controller may be configured to analyze the captured one or more images to determine a parameter associated with the flight of the object.

In some embodiments, the present disclosure describes a method of monitoring a flight of an object through a field of view using a launch monitor including an imaging device, a lighting unit including an array of LED light assemblies, and a controller. The method may include opening a shutter of the imaging device. The method may also include providing, using the controller, a first trigger signal to the lighting unit, causing the lighting unit to emit a first flash of light for a first time period. The method may include capturing, using the imaging device, a first image of the object traversing the field of view during the first time period. Further, the method may include waiting for a predetermined time period after the first time period. The method may also include providing a second trigger signal to the lighting unit, causing the lighting unit to emit a second flash of light for a second time period. The method may include capturing, using the imaging device, a second image of the object traversing the field of view during the second time period. The method may include closing the shutter of the imaging device. Further, the method may include determining, using the controller, at least one of a speed of the object, a trajectory of the object, or a spin of the object based on an analysis of the first image and the second image.

BRIEF DESCRIPTION OF THE DRAWINGS

The foregoing and other aspects of the present disclosure are best understood from the following detailed description when read in connection with the accompanying drawings. It is to be understood that the disclosure is not limited to the illustrated or disclosed embodiments. Included in the drawings are the following Figures.

DETAILED DESCRIPTION

Figure 1:
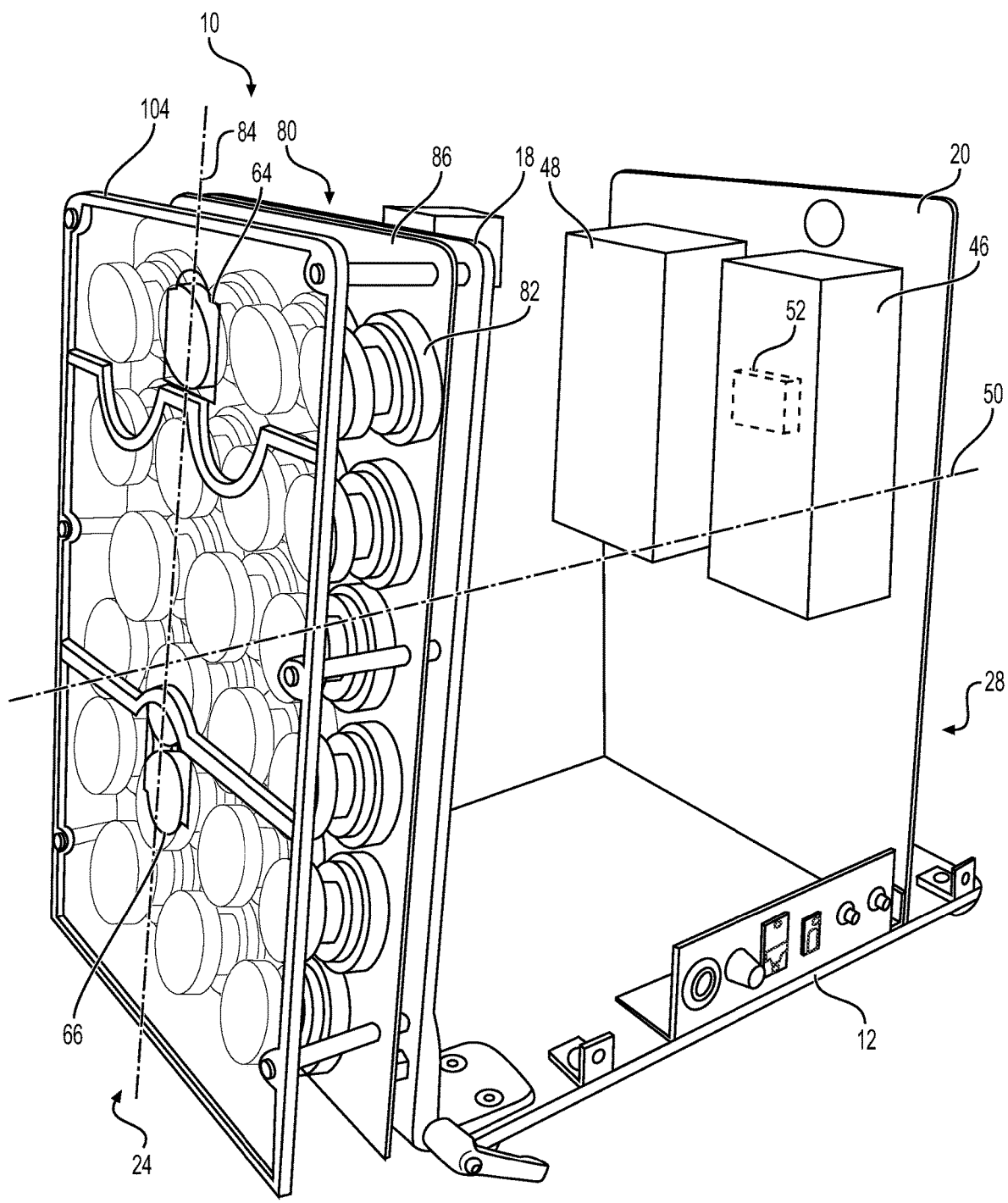
FIG. 1 is a partial perspective view of an exemplary launch monitor with its cover removed.

FIG. 1 illustrates an exemplary embodiment of launch monitor 10. In some exemplary embodiments, launch monitor 10 may be portable. Launch monitor 10 may include base 12. Legs 14, 16 (see FIG. 2) may extend from base 12 and may be configured to support launch monitor 10 over a ground surface. It is contemplated that in some exemplary embodiments, legs 14, 16 may include one or more configurations or methods of moving, such as wheels (or spherical rollers). Legs 14, 16 may include a height adjustment feature allowing front corner 30 and rear corner 32 of launch monitor 10 to be raised or lowered for leveling purposes relative to a ground surface. Although only legs 14 and 16 have been illustrated in FIG. 1, it is contemplated that additional similar legs may be provided at all four corners of launch monitor 10.

Figure 2:
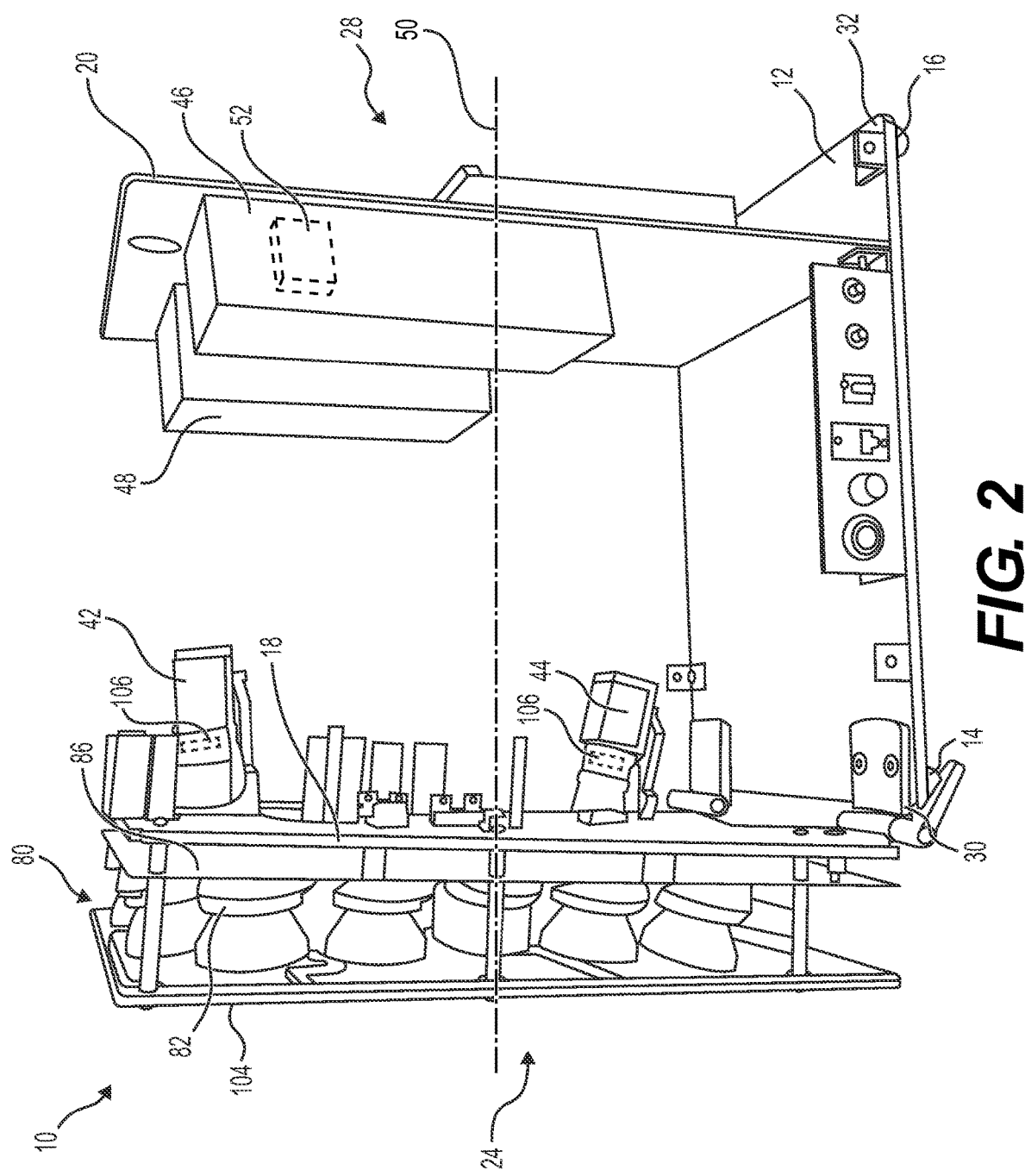
FIG. 2 is a partial side view of the exemplary launch monitor of FIG. 1 with its cover removed.

Referring now to FIGS. 1 and 2, launch monitor 10 may extend from front end 24 to rear end 28. Launch monitor 10 may include front wall 18 positioned adjacent to front end 24 and rear wall 20 positioned adjacent to rear end 28. Front wall 18 and rear wall 20 may extend from base 12 and may be connected to base 12. First and second imaging devices 42, 44 may be supported on base 12. For example, as illustrated in FIG. 2, first and second imaging devices 42, 44 may be attached to front wall 18, which in turn may be attached to base 12. First and second imaging devices 42, 44 may face front end 24. A field-of-view associated with launch monitor 10 may include a portion of an environment in front of launch monitor 10 that may be imageable by imaging devices 42, 44. In some exemplary embodiments, imaging devices 42, 44 may each include a camera configured to capture an image of the field-of-view of launch monitor 10. It is contemplated that imaging devices 42, 44 may include still or video cameras, charge coupled device (CCD) cameras, or other types of digital cameras configured to obtain one or more digital images of the field of view of launch monitor 10.

Launch monitor 10 may have a longitudinal axis of symmetry 50 extending from front end 24 to rear end 28. In one exemplary embodiment as illustrated in FIG. 2, imaging devices 42 and 44 may be positioned equidistant from axis of symmetry 50. Imaging devices 42, 44 may be inclined relative to each other and relative to axis of symmetry 50 such that lines of sight of imaging devices 42, 44 may form an angle relative to each other and/or with respect to axis of symmetry 50. In some exemplary embodiments, an angle between the lines of sight of imaging devices 42, 44 may be in the range of about 10° to 30°. Each of the imaging devices 42, 44 may include a light-receiving aperture, shutter, and light sensitive surface. Imaging devices 42, 44 may be directed and focused on a predetermined field-of-view in which an object moves and may be imaged. As used in this disclosure, the terms about or generally should be interpreted to encompass typical design and/or manufacturing tolerances known to a person of ordinary skill in the art. Thus, for example an angle of about 100 may encompass angles in the range of 10°±1°.

Launch monitor 10 may also include control box 46 and power supply 48. Control box 46 may include, for example, one or more controllers 52 that may be associated with one or more memories, one or more databases, one or more communications devices, one or more input-output devices, one or more sensors, and/or any other electronic devices that may be required to control operations of launch monitor 10. Controller 52 may include or be associated with one or more processors. For example, controller 52 may embody a single microprocessor or multiple microprocessors, digital signal processors (DSPs), application-specific integrated circuit devices (ASICs), etc. Numerous commercially available microprocessors may be configured to perform the functions of controller 52. Various other known circuits may be associated with controller 52, including power supply circuits, signal-conditioning circuits, and/or communication circuits.

The one or more memory devices associated with controller 52 may store, for example, data and/or one or more control routines, instructions, mathematical models, algorithms, machine learning models, etc. The one or more memory devices may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 52 may execute one or more routines, instructions, mathematical models, algorithms, and/or machine learning models stored in the one or more memory devices to generate and deliver one or more command signals to one or more of imaging devices 42, 44, and/or other components of launch monitor 10 (e.g., lighting unit 80, or LED light assembly 82 as described below).

Power supply 48 may be configured to supply power for operation of one or more components of launch monitor 10. For example, power supply 48 may be configured to supply power for operation of imaging devices 42, 44, lighting unit 80, control box 46, and/or other components of launch monitor 10. Power supply 48 may be electrically connected to the one or more components of launch monitor 10 via one or more connectors or wires (not shown). In some embodiments, power supply 48 may include a battery. In other embodiments, power supply 48 may be connectable to an external power grid for receiving power from the external power grid.

As illustrated in FIGS. 1 and 2, lighting unit 80 may be positioned in front of front wall 18 and facing towards front end 24. Imaging devices 42, 44 may be positioned in launch monitor 10 such that their respective lenses (not shown) may be directed towards the predetermined field-of-view through apertures 64, 66 that may extend through a width of lighting unit 80 and through a thickness of front wall 18. One or more communication lines (not shown) may transfer signals from imaging devices 42, 44, respectively, to controller 52 and/or to the one or more memory devices associated with controller 52. It is contemplated, however, that in some exemplary embodiments, imaging devices 42, 44 may be configured to transfer signals representative of the captured images wirelessly to controller 52 and/or to the one or more memory devices associated with controller 52.

In some exemplary embodiments, a microphone (not shown) may be used to begin operation of launch monitor 10. For example, when a golf club hits a golf ball, a sound captured by the microphone may be transmitted to controller 52, which in turn may cause lighting unit 80 to emit light and also trigger imaging devices 42, 44 to capture images of the golf ball and/or golf club in the predetermined field-of-view. Additionally or alternatively a laser or other apparatus (not shown) may also be used to initiate operation of launch monitor 10. For example, the initiating means may include a light beam and a sensor. When the moving golf ball and/or golf club passes through the light beam, the sensor may send a signal to controller 52, which in turn may initiate operations of lighting unit 80 and/or imaging devices 42, 44. When a laser is used, the laser may be arranged such that a golf club breaks the laser beam just after (or at the time) of contact with the golf ball. That is, the laser may be aligned directly in front of a teed golf ball and the imaging devices 42, 44 may be configured to capture images of the golf ball as or shortly after the golf ball leaves the tee.

As also illustrated in FIGS. 1 and 2, lighting unit 80 (or strobe 80) may be configured to emit one or more strobes or flashes of light to illuminate an object traversing the field-of-view. Lighting unit 80 may include supporting board 86. In some exemplary embodiments, lighting unit 80 may include a plurality of LED light assemblies attached to supporting board 86 and positioned about vertical axis of symmetry 84 of supporting board 86. In one exemplary embodiment as illustrated in FIG. 1, imaging devices 42, 44 may be positioned on a vertical plane passing through both the longitudinal axis of symmetry 50 and the vertical axis of symmetry 84 so that the LED light assemblies are positioned symmetrically about imaging devices 42, 44.

Figure 3:
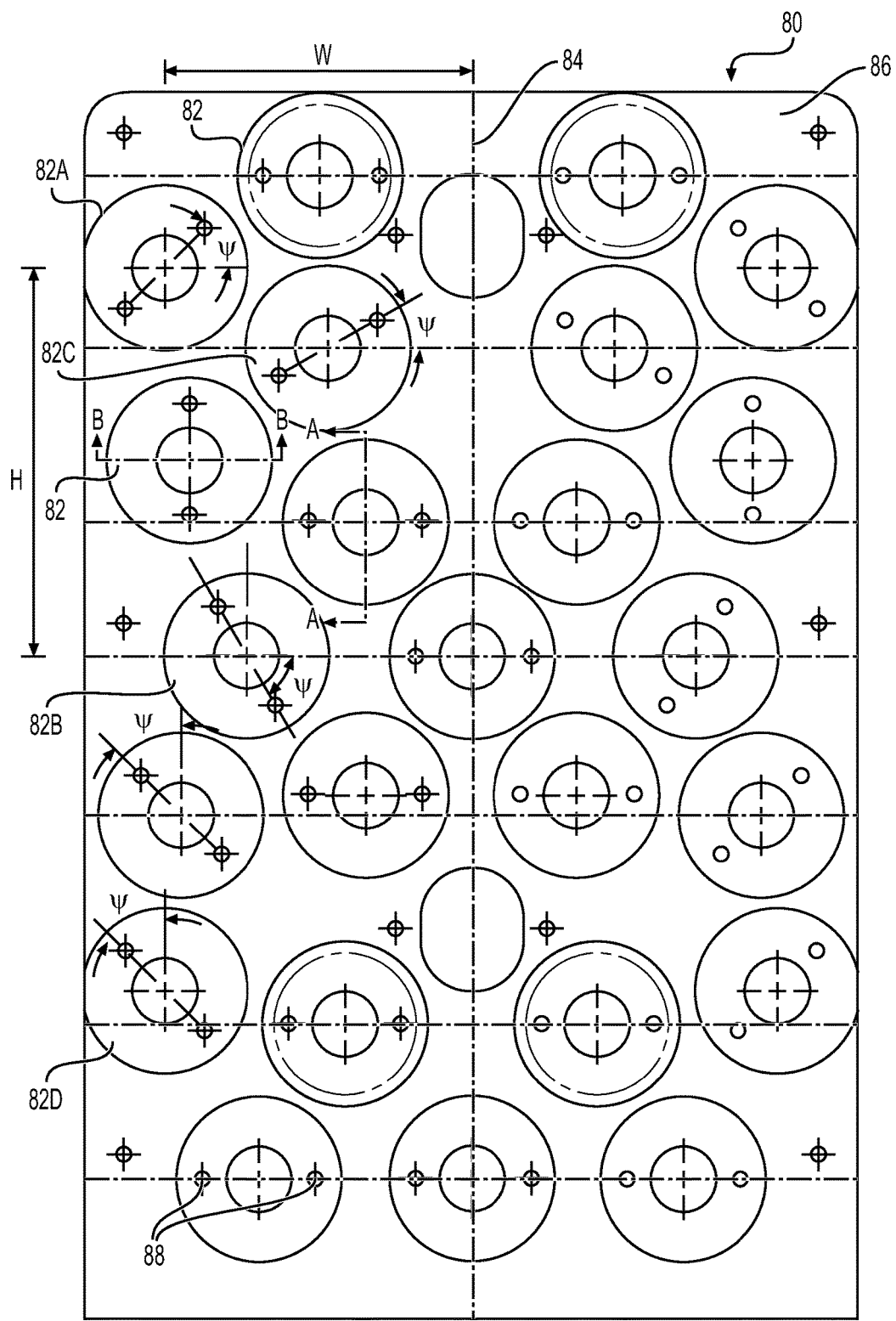
FIG. 3 is an elevation view of an exemplary lighting unit (or strobe) included in the launch monitor of FIG. 1.

FIG. 3 illustrates an elevation view of an exemplary lighting unit 80, including a plurality of LED light assemblies 82 attached to supporting board 86. Each LED light assembly 82 may be attached to supporting board 86 via one or more fasteners 88. In one exemplary embodiment as illustrated in FIG. 3, LED light assembly 82 may be attached to supporting board 86 using a pair of screws 88 disposed diametrically across from each other. The pair of screws 88 may allow LED light assembly 82 to be removed from supporting board 86, making it easy to repair and/or replace a defective or malfunctioning LED light assembly 82. Although screws 88 have been described above, other methods of attachment of LED light assembly 82 to supporting board 86 are also contemplated. Such methods may include the use of, for example, clips, clamps, rivets, pins, nuts and bolts, adhesives, welding, and/or brazing.

In some exemplary embodiments as illustrated in FIG. 3, LED light assemblies 82 may be arranged in the form of staggered array about vertical axis of symmetry 84 of supporting board 86. For example, as illustrated in FIG. 3, LED light assemblies 82 may be arranged in rows spaced apart from each other, where each row may include two or more LED light assemblies 82. A spacing between LED light assemblies 82 in the different rows may be the same or different. Although FIG. 3 illustrates a staggered array of LED light assemblies 82, it is contemplated that LED light assemblies 82 may be arranged in an in-line array having a plurality of rows, each including a same number of LED light assemblies 82 spaced apart from each other at a uniform distance. Other arrangements of LED lighting assemblies 82 (e.g., combination of in-line and staggered arrangements) are also contemplated. In one exemplary embodiment as illustrated in FIG. 3, lighting unit 80 may include 24 LED light assemblies 82. It is contemplated, however, that lighting unit 80 may include any number of light assemblies 82.

As also illustrated in FIG. 2, lighting unit 80 may be positioned symmetrically about longitudinal axis 50. For example, supporting board 86 of lighting unit 80 may be positioned such that vertical axis of symmetry 84 may intersect with axis of symmetry 50. In some exemplary embodiments, longitudinal axis of symmetry 50 of launch monitor 10 may be located equidistant from imaging devices 42, 44 or from the lines of sight of imaging devices 42, 44. Positioning lighting unit 80 this manner may allow equal amounts or intensity of light to be directed to the field-of-view.

Figure 4A:
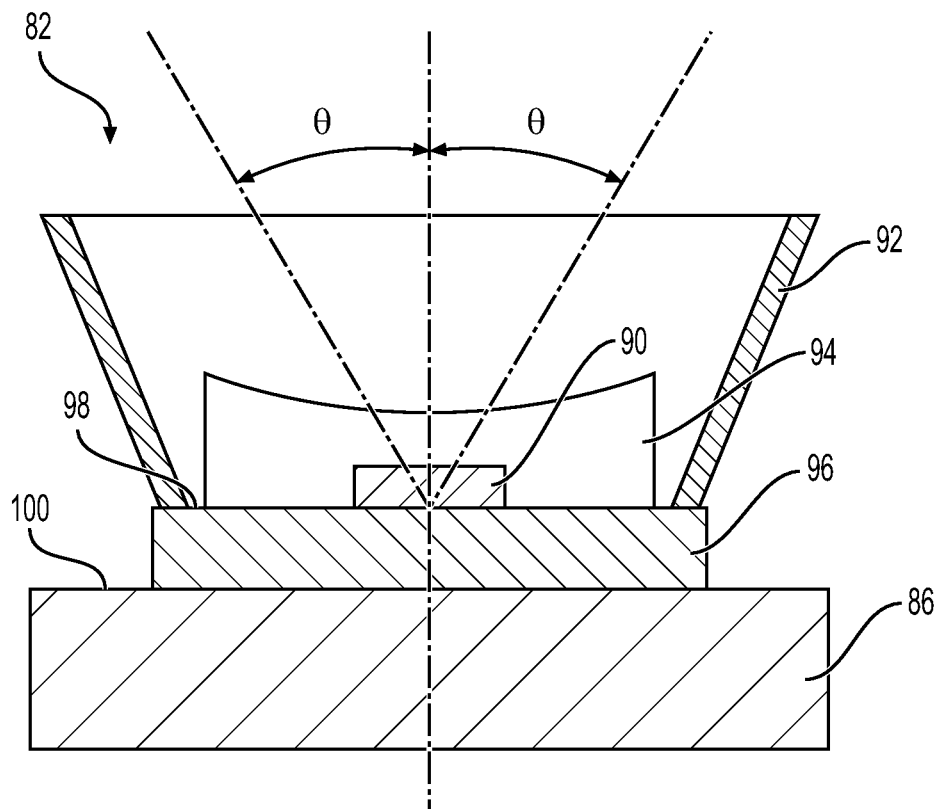
FIG. 4A is a cross-sectional view of an exemplary LED light assembly included in the lighting unit of FIG. 3.

FIG. 4A illustrates a cross-sectional view A-A (see FIG. 3) of LED light assembly 82. As illustrated in FIG. 4A, LED light assembly 82 may include LED light source 90 mounted in a carrier or enclosure 92. LED light source 90 may include one or more semiconductor devices configured to emit light when subjected to an electric current flow. A duration of light emitted by LED light source 90 may be determined based on a trigger signal used to activate LED light source 90. For example, controller 52 may be configured to generate a trigger signal that may in turn control a duration for which electric current flows through LED light source 90. In some exemplary embodiments, a duration (or time period) for which LED light source 90 emits light may be adjustable in a range from a fraction of a microsecond to several milliseconds to continuous illumination (e.g., an infinitely long time period) of LED light source 90. Controller 52 may also be configured to control a duration or time period between successive flashes of light by controlling the trigger signals. For example, controller 52 may generate successive trigger signals at varying time durations to control or adjust a frequency with which LED light source 90 emits flashes of light. Because LED light source 90 emits light in response to the trigger signals generated by controller 52, the duration of each flash of light and the timing between successive flashes of light emitted by LED light source 90 may be precisely controlled.

In one exemplary embodiment, LED light source 90 may include a chip-on-board (COB) LED that may include a plurality of small LED semiconductor devices within enclosure 92. Using such a COB LED light source 90 may help to increase an amount of light that may be emitted by LED light source 90 per unit area. In some exemplary embodiments, LED light source 90 may be configured to emit white light. In other exemplary embodiments, LED light source 90 may be configured to emit colored light. Enclosure 92 may be made of any material and may be configured to enclose and support LED light source 90 and/or other components of LED light assembly 82.

Figure 5A:
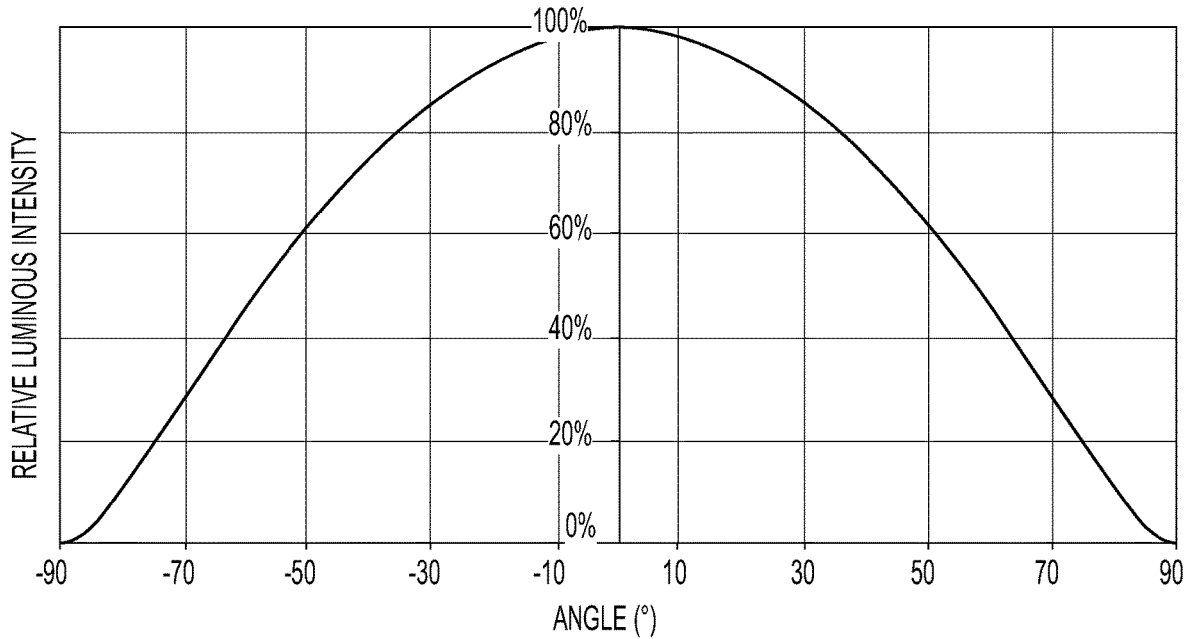
FIG. 5A illustrates a variation of intensity of light emitted by an exemplary unfocused LED light source included in the lighting unit of FIG. 3.

LED light assembly 82 may include lens 94 configured to focus light emitted by LED light source 90. For example, FIG. 5A illustrates a variation of an intensity of light emitted by LED light source 90 relative to an angle θ (see FIG. 4A) measured with respect to an axis of symmetry extending perpendicular to LED light source 90. As illustrated in FIG. 5A, the intensity of light emitted by LED light source 90 has a wide spatial distribution. That is, a majority of the light emitted by LED light source 90 is angularly spread out over angles θ ranging between about ±50° or about ±70°.

Figure 5B:
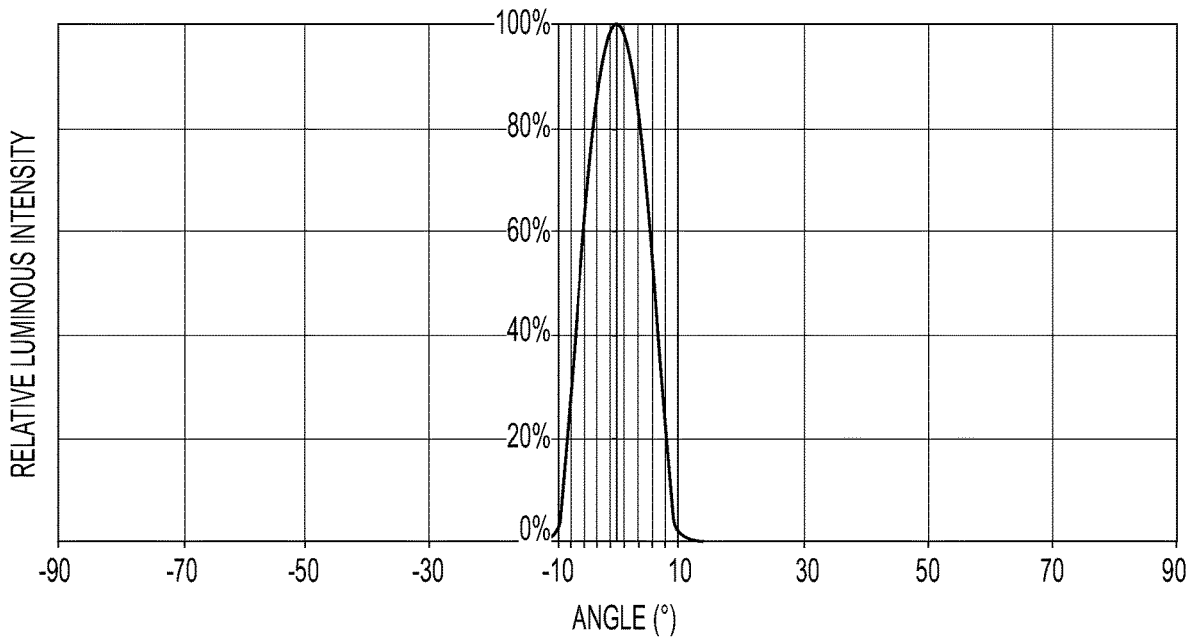
FIG. 5B illustrates the variation of intensity of light emitted by an exemplary combination of a lens and the LED light source included in the lighting unit of FIG. 3.

Such a wide angular distribution of light intensity may not be suitable for use in a launch monitor. For example, in a typical use of launch monitor 10, the target area or field-of-view is approximately 11 inches wide at a distance of about 24 inches from launch monitor 10. Thus, the field-of-view encompasses an angle of about ±13° (arctan (5.5/24)) from a center of the field-of-view. As a result, light emitted outside angle θ of about ±13° may be wasted and may not serve to illuminate the object in the field-of-view. Lens 94 may help to focus light being emitted by LED light source 90 so that almost all of the light emitted by LED light source 90 to be used to illuminate an object in the field-of-view of launch monitor 10. For example, FIG. 5B illustrates the variation of intensity of light emitted by LED light source 90 when focused using lens 94. As illustrated in FIG. 5B, lens 94 helps to focus a majority of the light emitted by LED light source 90 within an angle θ encompassing about ±12°.

Another advantage of using LED light assemblies 82 in lighting unit 80 may result from the significantly lower voltage and current required to operate LED light source 90. In contrast, conventional flashtubes may operate at several hundred volts with a current of several hundred amperes. Such high voltages and currents may generate significant amounts of radio frequency radiation that may affect various control circuits used to control the duration of time between flashes, introducing additional errors in determination of the flight parameters associated with an object traversing the field-of-view of a launch monitor. Because LED light source 90 operates at a significantly lower voltage and current (e.g., almost two orders of magnitude smaller voltage and current), the amount of radio frequency radiation is also significantly lower with the use of LED light assemblies 82. This in turn may allow for more precise control of the duration or each flash of light and the time period between successive flashes of light.

Figure 4B:
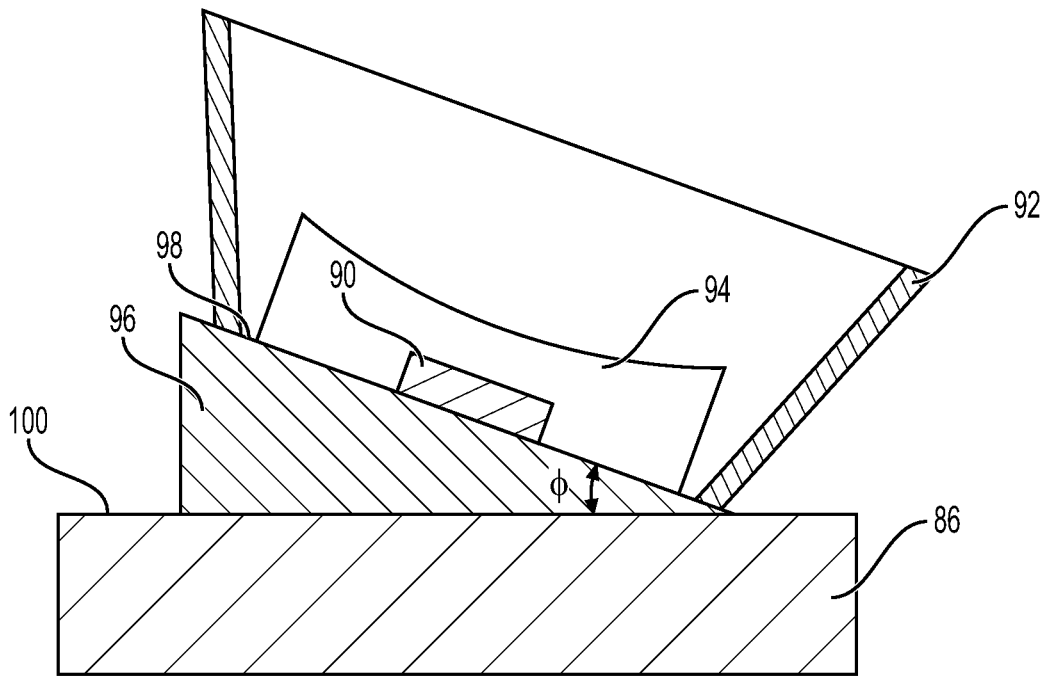
FIG. 4B is a cross-sectional view of another exemplary LED light assembly included in the lighting unit of FIG. 3.

A size of LED light assembly 82 may be large such that a width W and/or height H of supporting board 86 may be wider and/or taller than the field-of-view that may be about 11 inches wide at a distance of 24 inches from launch monitor 10. In some exemplary embodiments, each LED light assembly 82 may be about 2 inches wide and as a result, supporting board 86 may be more than 11 inches wide and more than 12 inches tall. Therefore, it may be necessary to direct light from LED light assemblies 82 towards a center of the field-of-view. FIG. 4B illustrates a cross-sectional view B-B (see FIG. 3) of LED light assembly 82. As illustrated in FIG. 4B, LED light assembly 82 may include wedge 96 positioned between LED light source 90 and supporting board 86. Wedge 96 may have a generally circular shape and may have a slope in a direction perpendicular to an axis passing through screws 88. For example, wedge 96 may include inclined surface 98 disposed at an angle φ relative to upper surface 100 of supporting board 86. Angle φ may range from about 0° to about 15°. For example, as illustrated in FIG. 4A, surface 98 of wedge 96 may be disposed parallel to upper surface 100 of supporting board 86, thereby providing a wedge having a slope angle φ of about 0°. Although wedge angles 4 of about 0° to about 15° have been discussed above, it is contemplated that angle φ may take values other than those in the range from about 0° to about 15°.

Wedge 96 may be rotatable in a clockwise or counter-clockwise direction by an angle ψ that may range between about 0° to about 90°. As illustrated in FIG. 3, different LED light assemblies 82 may have wedges 96 rotated at different angles ψ. For example, as illustrated in FIG. 3, wedge 96 of LED light assembly 82A may be rotated in a counterclockwise direction by an angle ψ of about 45°. By way of another example as illustrated in FIG. 3, wedge 96 of LED light assembly 82B may be rotated in a clockwise direction by an angle ψ of about −60°. As also illustrated in FIG. 3, different LED light assemblies 82 attached to supporting board 86 may have wedges 96 having different slopes. For example, LED light assembly 82C may have wedge 96 having a slope of 10°, whereas LED light assembly 82D may have wedge 96 having a slope of 15°. It is contemplated, however, that in some exemplary embodiments, all LED light assemblies 82 attached to supporting board 86 may have wedges 96 having the same angle φ.

Figure 5C:
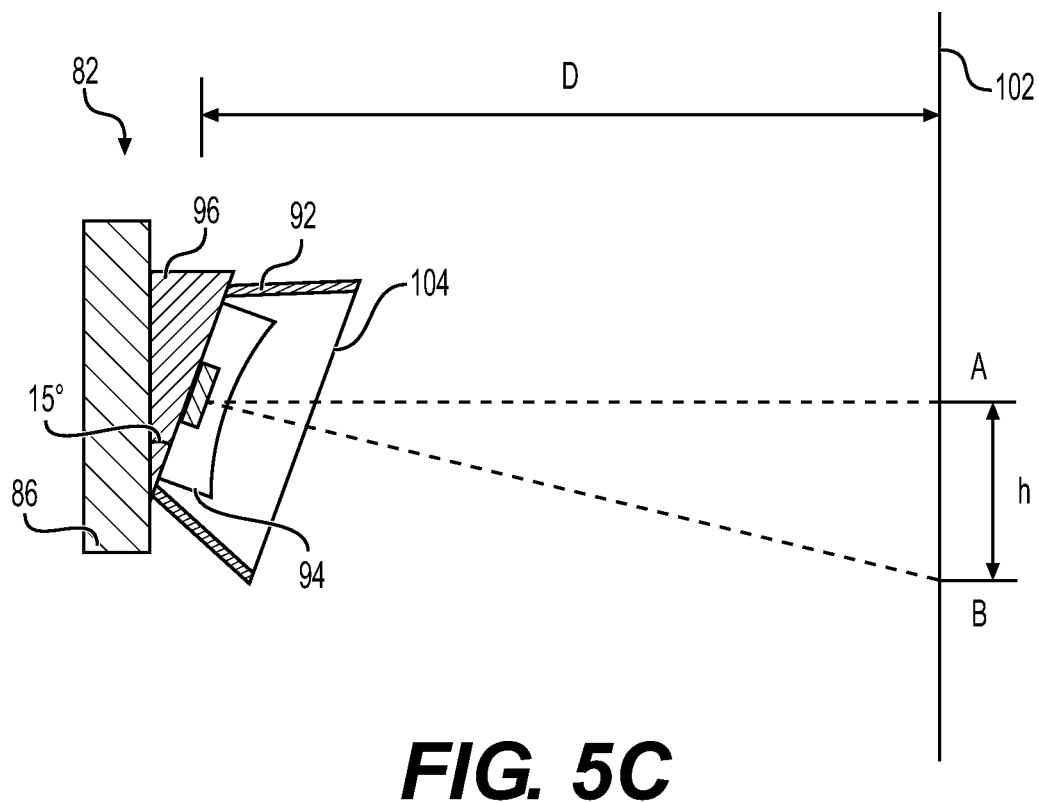
FIG. 5C illustrates an exemplary side elevation view of an LED light assembly, showing the effect of tilting an LED light assembly of FIG. 4A or 4B.

As discussed above, wedges 96 may be used to aim or direct light from each LED light assembly 82 towards a center of the field-of-view. FIG. 5C illustrates an exemplary lighting unit 80 located at a distance D (e.g., of 24 inches) from a desired field of view represented by a plane 102. An LED light assembly 82 having a wedge 96 with an angle φ of about 0° (e.g., LED light assembly 82 of FIG. 4A) may cause light from LED light source 90 to be direct towards point A on plane 102. As illustrated in FIG. 5C, an LED light assembly 82 having a wedge 96 with an angle φ of about 15° (e.g., LED light assembly 82 of FIG. 4B) Inserting a wedge 96 having an angle φ of about 15° without rotating the wedge may cause light from LED light source 90 to be direct towards point B on plane 102, at a distance h below point A. In the above example, where LED light assembly 82 is located about 24 inches from the field-of-view, and with a wedge 96 having an angle φ of about 15°, a distance H between points A and B may be about 6.43 inches (24×tan (15°)=6.43).

Figure 5D:
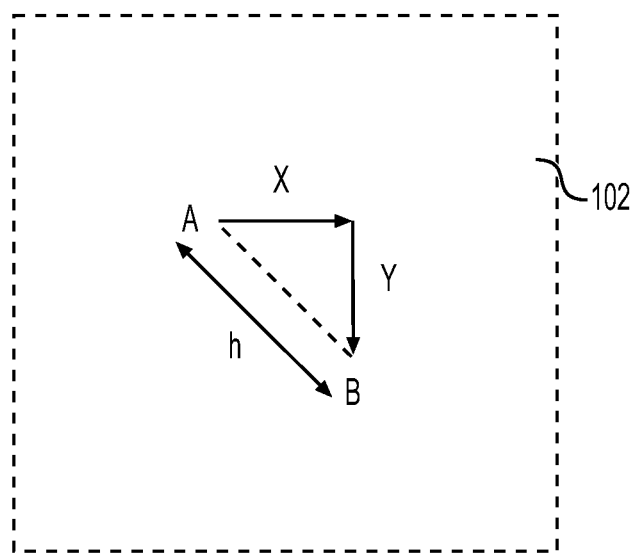
FIG. 5D illustrates an exemplary front elevation view of a portion of the field-of-view of the launch monitor of FIG. 1, showing the effect of tilting and rotating an LED light assembly of FIG. 4A or 4B.

FIG. 5D illustrates the result of rotating the wedge by an angle ψ of, for example, about 45°. As illustrated in FIG. 5D, and with reference to the above example, distance h between points A and B may still remain 6.43 inches when a wedge 96 having an angle φ of about 15° is employed. However because of the rotation of the wedge 96 by an angle ψ, the light from LED light assembly 82 may be directed to point B that may be located at a distance X smaller than distance h. For example, when LED light assembly 82 is used with a wedge having an angle φ of about 15°, and an angle of rotation ψ of about 45°, distance X between points A and B may be about 4.5 inches (6.43×cos (45°)=4.5) and distance Y between points A and B may be about 4.5 inches (6.43×sin (45°)=4.5).

Further, as illustrated in FIG. 3, LED light assembly 82A may be located, for example, at a height H of 5.5 inches above and width W of 3.75 inches to the left of the center of the target. Thus, for example, light from LED light assembly 82 would be directed at a point A that may be 5.5 inches above and 3.75 inches to the left of a center of a field-of-view. Using a wedge 96, having a slope angle φ(of for example 15°) and with the wedge rotated at an angle ψ(of for example 45°) would move the center of the light emitted by LED light assembly 82A by a distance of 4.5 inches below and to the right of the center of LED light assembly 82A. This in turn would cause the light to be directed to a point 1 inch above (5.5−4.5=1) and 0.75 inches to the right of (3.75−4.5=−0.75) the center of the field-of-view. It is to be noted that the dimensions and angles describe above are exemplary and nonlimiting, and dimensions D, H, W, and angles 4 and y may take values different from those discussed above. Thus, a slope 4 and angle of rotation y of wedges 96 of each LED light assembly 82 may be adjusted to allow light from each LED light assembly 82 to be directed towards a center of the field-of view.

Notably, if all the light from each LED light assembly 82 were to be directed towards the center of the field-of-view, the center would have a maximum intensity of light (e.g., would be very bright) and the outboard edges of the field-of-view would have a smaller intensity of light (e.g., would be darker). To improve uniformity of lighting over the entire field of view, therefore, wedges 96 of at least some of the LED light assemblies 82 may be adjusted to direct the light away from the center of the field of view.

It is contemplated that wedges 96 of each of the LED light assembly 82 may be equipped with knobs, levers, or other actuation mechanisms to allow the wedges 96 to be rotated and adjusted such that light emitted by lighting unit 80 is distributed uniformly over the field-of-view. Such adjustment of wedges 96 may be made during manufacture of launch monitor 10 and/or during calibration or use of launch monitor 10. It is further contemplated that in some exemplary embodiments, wedges 96 of LED light assembly 82 may be equipped with one or more rotary actuators that may be rotated to any desired angle ψ based on control signals received from controller 52. By way of example, wedges 96 may be equipped with a motor that may be configured to be rotated by any desired angle ψ based on a control signal received from controller 52.

As also discussed above, LED light source 90 may be configured to emit light during the time period when current flows through a semiconductor device associated with LED light source 90. Thus, a duration and frequency of current flow through LED light source 90 may be controlled to adjust the duration of each flash of light, and/or the duration between successive flashes of light emitted by LED light source 90. For example, controller 52 may be configured to generate a trigger signal that may determine a duration for which current may flow through a semiconductor device associated with LED light source 90. Similarly, controller 52 may generate a trigger signal that may stop the current flow through the semiconductor device associated with LED light source 90 for a predetermined time period. Controller 52 may also be configured to subsequently generate a trigger signal that may cause current to flow through the semiconductor device associated with LED light source 90 after the predetermined period of time. Thus, controller 52 may be configured to control the duration between successive emissions of light (e.g., the predetermined time period) from LED light source 90. Accordingly, by modulating the trigger signals provided to each LED light source 90, controller 52 may be configured to control the duration and frequency of flashes of light emitted by each LED light source 90. It is contemplated that controller 52 may be configured to generate the trigger signals such that LED light source is 90 may be able to emit successive flashes of light within a few microseconds of each, thereby overcoming the long recharge time (e.g., of the order of milliseconds) problems associated with conventional flashtubes. Furthermore controller 52 may be configured to control a rate (or frequency) at which trigger signals are generated and supplied to LED light source 90, thus controlling the duration between successive flashes of light emitted by LED light source 90.

Returning to FIGS. 1 and 2, lighting unit 80 may include polarizing film 104 that may cover lens 94 of each of the LED lighting units 82. Polarizing film 104 may be configured to help reduce specular glare, resulting from reflections of light by an object (e.g., golf ball or golf club) in the field-of-view. Imaging devices 42, 44 may similarly include polarizing film 106 (see FIG. 2) located in the optical path between the field-of-view and an imaging element of imaging devices 42, 44. It is contemplated that an axis of polarization of polarizing film 104 may be disposed generally perpendicular to an axis of polarization of polarization film 106 and imaging devices 42, 44. Polarizing films 104 and 106 may help to reduce the specular glare, resulting from reflections of light by an object in the field-of-view.

Figure 6:
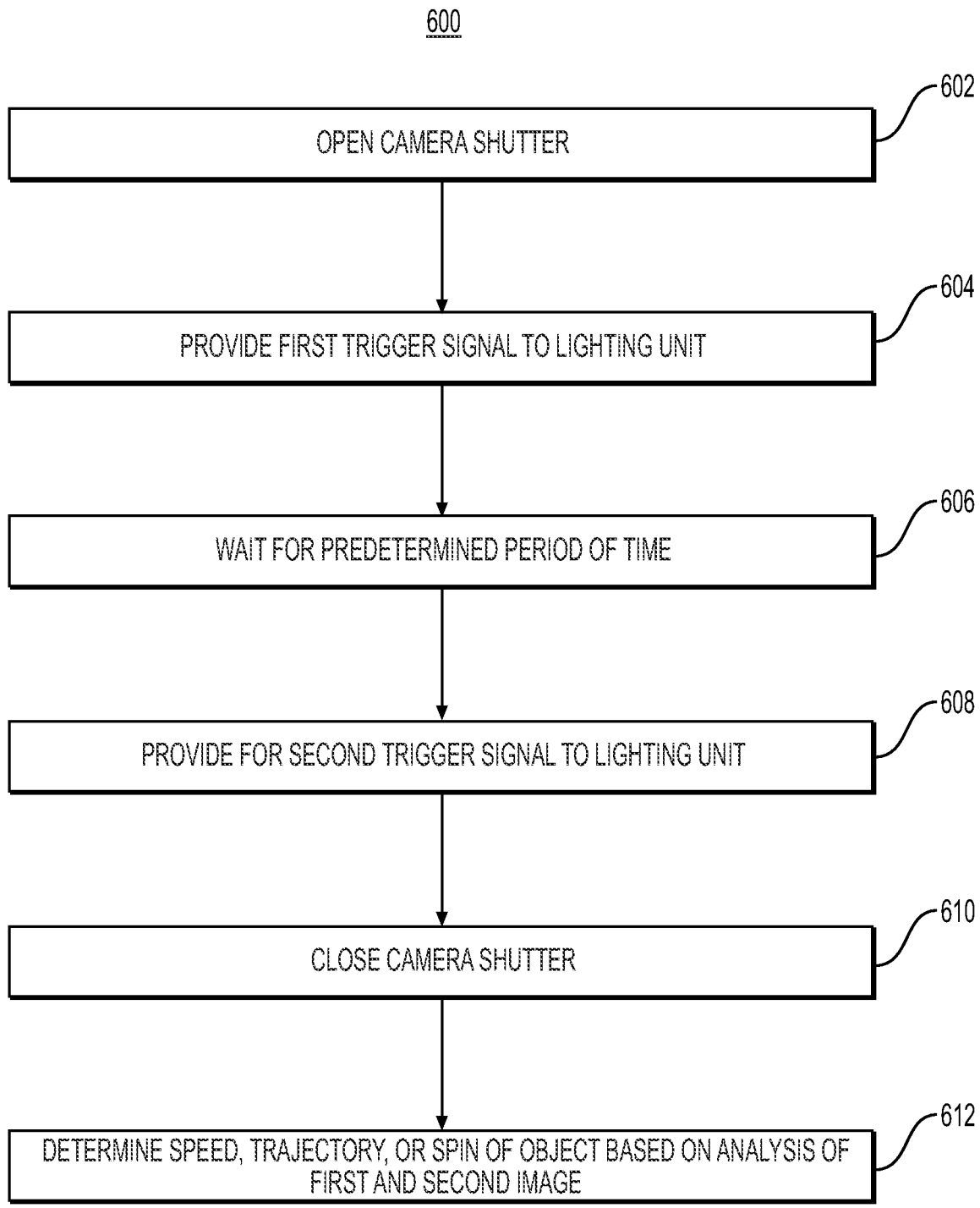
FIG. 6 is a flowchart illustrating an exemplary method of monitoring a flight of an object through a field of view using the launch monitor of FIG. 1.

FIG. 6 illustrates an exemplary method 600 of monitoring a flight of an object through a field of view using launch monitor 10, including one or more of imaging devices 42, 44, lighting unit 80 having an array of LED light assemblies 82, and controller 52. In one exemplary embodiment, controller 52 may execute instructions stored in a memory, storage medium, or database to perform method 600. The order and arrangement of steps in method 600 is provided for purposes of illustration. As will be appreciated from this disclosure, modifications may be made to method 600 by, for example, adding, combining, removing, and/or rearranging the steps of method 600.

Method 600 may include a step of opening a shutter (not shown) of one or more of imaging devices 42, 44 (Step 602). For example, controller 52 may generate a signal and transmit that signal to imaging devices 42, 44. In response to the signal, one or both of imaging devices 42, 44 may cause their respective shutters to open and allow any light reflected from the field of view to be received by an imaging element of imaging devices 42, 44.

Method 600 may include a step of providing a first trigger signal to lighting unit 80, causing the array of LED light assemblies 82 to emit a first flash of light for a first time period (Step 604), For example, controller 52 may generate a first trigger signal that may determine an amount of current and a duration for the flow of the amount of current through one or more LED light sources 90 in corresponding LED light assemblies 82. The duration of current flow through each LED light source 90 may be determined by the first trigger signal generated by controller 52 and may cause LED light assembly 82 to emit a first flash of light for a first time period (e.g., for the duration of the current flow). Because a shutter of one or both imaging devices 42, 44 is open (see e.g., step 602), one or both imaging devices 42, 44 may be configured to capture a first image of an object (e.g., golf ball and/or golf club). For example, one or both imaging devices 42, 44 may be configured to capture a first image of an object as the object traverses (e.g., moves through) the field-of-view during the first time period for which LED light assembly 82 may emit the first flash of light.

Method 600 may include a step of waiting for a predetermined time period (Step 606). For example, controller 52 may be configured to generate a trigger signal and transmit that trigger signal to lighting unit 80 and/or power supply 48. In response to the trigger signal, power supply 48 may pause a flow of current through LED light sources 90, causing lighting unit 80 to be turned off during the predetermined period of time so that no light is emitted during the predetermined period of time. Controller 52 may be configured to generate the trigger signal to control the predetermined time period. For example, the trigger signal may determine the predetermined time period for which current is not supplied to the one or more semiconductor devices associated with each of the LED light assemblies 82, thereby preventing emission of light from the LED light assemblies 82 for the predetermined time period. The predetermined time period may be one or more microseconds, one or more milliseconds, or any other time period. The trigger signal generated during step 606 may be different from the first trigger signal generated during, for example, step 602.

Method 600 may include a step of providing a second trigger signal to lighting unit 80, causing the array of LED light assemblies 82 to emit a second flash of light for a second time period (Step 608). Controller 52 and LED light assembly 82 may perform functions similar to those discussed above, for example, for step 604. For example, controller 52 may be configured to control the duration for which current flows through the one or more semiconductor devices associated with each of the LED light assembly 82. By controlling the duration of current flow in this manner, controller 52 may be able to control the extent of the first and/or second time period for which LED light assemblies 82 may emit flashes of light. It is contemplated that the first time period may be the same as or different from the second time period. Because a shutter of one or both imaging devices 42, 44 is open (see e.g., step 602), one or both imaging devices 42, 44 may be configured to capture a second image of an object (e.g., golf ball and/or golf club) as the object traverses (e.g., moves through) the field-of-view during the second time period for which LED light assembly 82 may emit the first flash of light.

As described above, controller 52 may be configured to control the duration of time that passes between emission of the first flash of light and emission of the second flash of light by controlling the predetermined time period as described, for example, for step 606. As also described above, controller 52 may be configured to cause the LED lighting assemblies 82 to emit a second flash of light only a few microseconds after emitting the first flash of light (e.g., by causing the predetermined period of time to be a few microseconds) thereby obviating the problems of recharge time associated with conventional flashtubes.

Method 600 may include a step of closing the shutter of one or more of imaging devices 42, 44 (Step 610). For example, controller 52 may generate a signal and transmit that signal to imaging devices 42, 44. In response to the signal, one or both of imaging devices 42, 44 may cause their respective shutters to close, preventing any light reflected from the field of view to be received by an imaging element of imaging devices 42, 44.

Method 600 may include a step of determining one or more parameters associated with the flight of the object as the object traverses the field of view based on an analysis of the first image and the second image captured by the one or more imaging devices 42, 44 (Step 612). For example, controller 52 may execute one or more image processing routines to identify any image of the object in the first image and the second image. Such image processing routines may include one or more of edge detection, convolutions, fast Fourier transforms, pattern recognition, and/or clustering. Controller 52 may also be configured to determine a position of the object relative to a fixed coordinate system based on identification of the object in the first image and the second image. Controller 52 may be configured to determine a speed of the object as the object traverses the field-of-view. For example, controller 52 may determine a distance traveled by the object based on the positions of the object in the first image and the second image. Controller 52 may also be configured to determine an amount of time elapsed between the time that imaging devices 42, 44 captured the first image and when imaging devices 42, 44 captured the second image. Controller 52 may determine the time elapsed based on, for example, time stamps associated with the first image and the second image. In some embodiments, controller 52 may determine the time elapsed using one or more internal clocks. Controller 52 may be configured to determine a speed of the object based on the distance traveled by the object and the time elapsed between capture of the first image and the second image. Controller 52 may also be configured to use mathematical expressions or algorithms, lookup tables, programs, and/or trained machine learning models to determine other parameters such as a trajectory (e.g., mapping of positions of the object over time) and/or spin (e.g., rate of rotation of object about one or more axis associated with the object) based on the position and time data extracted from, for example first image and second image.

It will be apparent to those skilled in the art that various modifications and variations can be made to the disclosed embodiments of the launch monitor. Other embodiments will be apparent to those skilled in the art from consideration of the specification and practice of the disclosed launch monitor. Therefore, it will be understood that the appended claims are intended to cover all such modifications and embodiments, which would come within the spirit and scope of the present disclosure.

What is claimed is:

1. A launch monitor configured to monitor a flight of an object traversing a field of view, the launch monitor comprising:
   a base;
   an imaging device supported on the base and configured to capture one or more images of the object traversing the field of view;
   a lighting unit comprising one or more lights, a supporting board, and a rotatable wedge disposed between each of the one or more lights and the supporting board, each rotatable wedge comprising an inclined surface disposed at an angle relative to an upper surface of the supporting board, the lighting unit being configured to emit one or more flashes of light to illuminate the object in the field of view, wherein a duration of the one or more flashes of light or a predetermined time period between the one or more flashes of light is adjustable; and
   a controller configured to:
      generate one or more trigger signals to cause the lighting unit to emit the one or more flashes of light, the one or more trigger signals being configured to control at least one of the duration of each of the one or more flashes of light or the predetermined time period between the one or more flashes of light;
      cause the imaging device to capture the one or more images of the object when the object is illuminated by the one or more flashes of light; and
      analyze the captured one or more images to determine a parameter associated with the flight of the object.

2. The launch monitor of claim 1, wherein the one or more lights include at least one light emitting diode (LED) configured to emit light and a lens configured to focus the emitted light.

3. The launch monitor of claim 2, wherein the LED chip-on-board LED.

4. The launch monitor of claim 1, wherein the one or more lights are removably attached to the supporting board.

5. The launch monitor of claim 1, wherein the rotatable wedge is configured to be rotatable by a rotation angle in a range of 0° to 90°.

6. The launch monitor of claim 1, wherein the one or more lights are removably attached to the supporting board via a pair of screws.

7. The launch monitor of claim 6, wherein the inclined surface extends in a direction perpendicular to an axis passing through the pair of screws.

8. The launch monitor of claim 1, wherein the angle ranges between 0° to 15°.

9. The launch monitor of claim 1, wherein the one or more lights include a plurality of LEDs attached to the supporting board and arranged in an array.

10. The launch monitor of claim 9, wherein
the rotatable wedge is positioned such that light emitted from at least some of the plurality of LEDs is directed towards a center of the field of view.

11. The launch monitor of claim 9, wherein the array includes 24 LEDs.

12. The launch monitor of claim 9, wherein the imaging device includes:
a first camera configured to capture the one or more images of the object traversing the field of view; and
a second camera configured to capture the one or more images of the object traversing the field of view,
wherein the array is positioned symmetrically relative to the first camera and the second camera.

13. The launch monitor of claim 2, wherein the lighting unit includes a first polarizing film.

14. The launch monitor of claim 13, further including a second polarizing film disposed in the imaging device.

15. The launch monitor of claim 14, wherein an axis of polarization for the first polarizing film is disposed perpendicular to an axis of polarization for the second polarizing film.

16. The launch monitor of claim 1, wherein the duration of each of the one or more flashes of light is adjustable from 1 microsecond to continuous illumination of the lighting unit.

17. The launch monitor of claim 1, wherein the predetermined time period between the one or more flashes of light is adjustable from 1 microsecond to at least 1 millisecond.

18. The launch monitor of claim 1, wherein the parameter associated with the flight of the object includes at least one of a speed of the object, a trajectory of the object, or a spin of the object.

19. A method of monitoring a flight of an object through a field of view using a launch monitor including an imaging device, a lighting unit including an array of LED light assemblies, and a controller, the method comprising:
opening a shutter of the imaging device;
providing, using the controller, a first trigger signal to the lighting unit, causing the lighting unit to emit a first flash of light for a first time period;
capturing, using the imaging device, a first image of the object traversing the field of view during the first time period;
waiting for a predetermined time period after the first time period;
providing a second trigger signal to the lighting unit, causing the lighting unit to emit a second flash of light for a second time period;
capturing, using the imaging device, a second image of the object traversing the field of view during the second time period;
closing the shutter of the imaging device; and
determining, using the controller, at least one of a speed of the object, a trajectory of the object, or a spin of the object based on an analysis of the first image and the second image;
wherein the first time period, the predetermined time period, or the second time period is adjustable, and
wherein the lighting unit further comprises a supporting board and a rotatable wedge disposed between each one of the array of LED light assemblies and the supporting board, each rotatable wedge comprising an inclined surface disposed at an angle relative to a surface of the supporting board.

\* \* \* \* \*